Jan. 13, 1931.   F. WOODS   1,788,758
RADIO DIRECTION FINDER
Filed Oct. 24, 1925
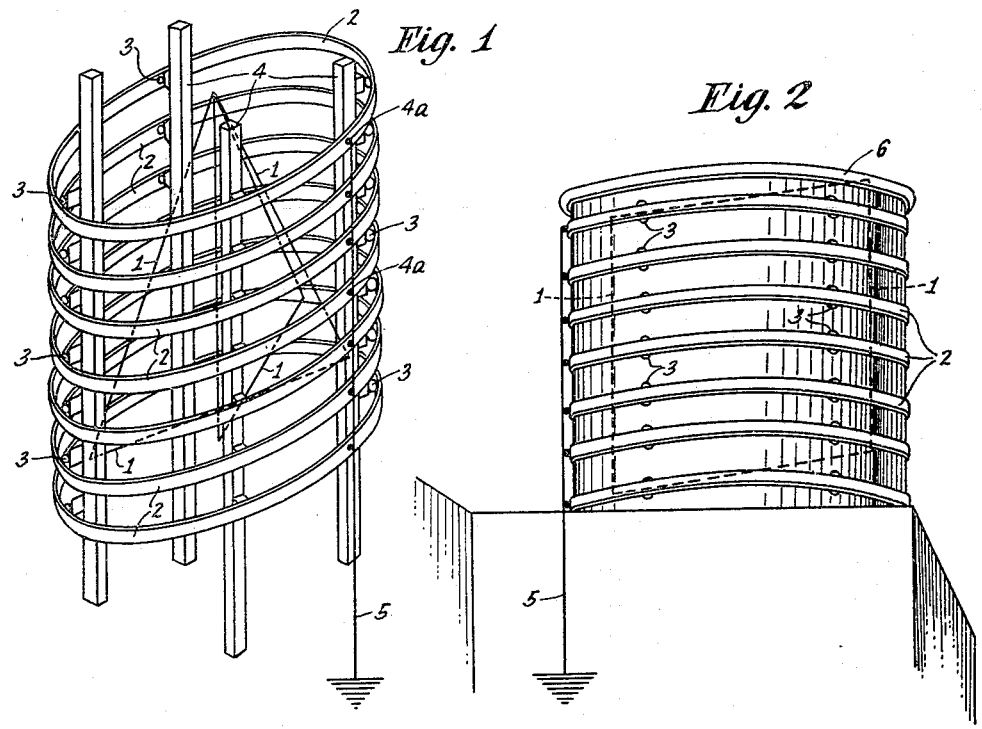
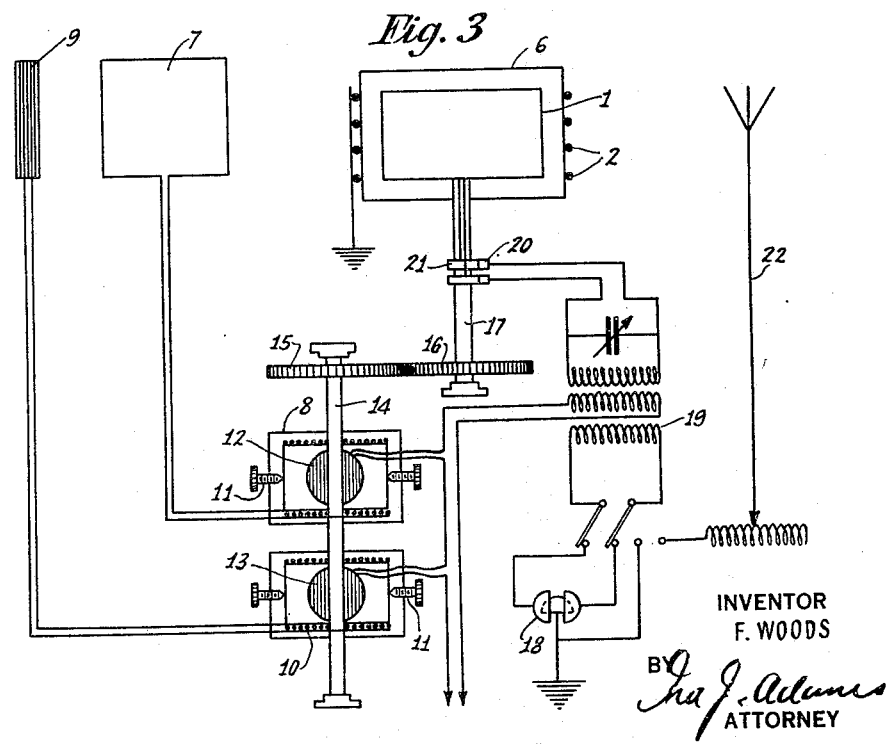
INVENTOR
F. WOODS
BY
ATTORNEY Patented Jan. 13, 1931

1,788,758

UNITED STATES PATENT OFFICE

FRED WOODS, OF LIVERPOOL, ENGLAND, ASSIGNOR TO RADIO CORPORATION OF AMERICA, A CORPORATION OF DELAWARE

RADIO DIRECTION FINDER

Application filed October 24, 1925, Serial No. 64,520, and in Great Britain January 15, 1925.

This invention relates to direction finders of the rotating coil and Bellini-Tosi types, and is applicable to the type described in my co-pending application Serial No. 33,064, filed May 26, 1925, for radio direction finders, in which I described a radio direction finder having a balancing circuit by means of which a reverse distortion could be applied to the reception diagram.

An arrangement was described which consisted of a rotatable aerial shunted by a variable condenser, an inductance coil forming one winding of a transformer, a second transformer winding connected to the detector, and a third winding of the transformer connected by two fixed plates of a three plate variable condenser and the movable plate of the condenser connected to earth.

According to this invention the direction finding aerial is surrounded with a number of earthed horizontal conducting rings whereby greater accuracy in the readings is obtained.

The aerial may be placed in a wood or other container, especially when intended for shipboard use, and the rings may then be mounted on the outside of the case and connected to each other by an earthed wire.

When the invention is applied to a direction finder of the type described in my application 33,064, the quadrantal error in the arrangement may be corrected by an auxiliary correcting device comprising a loop aerial having a comparatively few number of turns placed in an athwartship direction and connected to a screened fixed field coil.

A coupling coil mounted so as to be capable of rotation within the screened field coil is mechanically coupled to and rotates in step with the main direction finding aerial coil but in a reverse direction.

This coupling coil is connected so as to induce a supplementary E. M. F. into the amplifier.

A similar arrangement is provided with a coil aerial arranged in a fore and aft direction and the supplementary E. M. F.'s adjusted to correct for the quadrantal error of the main aerial loop.

In some cases one of these auxiliary correcting devices may be omitted.

The invention is illustrated in the accompanying drawings, of which Figure 1 shows the invention applied to a Bellini-Tosi aerial, Figure 2 shows the invention applied to a directional aerial of the rotating coil type, and Figure 3 shows the invention applied to a direction finder of the type described in my co-pending application Serial No. 33,064.

Referring to Figure 1, 1 is a direction finding aerial of the Bellini-Tosi type, comprising two mutually perpendicular fixed coils, each of which may comprise several turns of wire, and which may be connected to the field coils of a radiogoniometer, so that the bearings of an incoming signal may be taken in the usual well known way. Surrounding the aerial 1 is a plurality of earthed conducting rings 2, mounted upon insulators 3 carried by posts 4 which may be of wood. The said rings are bonded together as at 4a, and earthed by an insulated conductor 5 which is preferably of as short a length as possible.

Figure 2 shows a directional aerial 1 of the rotating coil type, surrounded by conducting rings 2, mounted upon a container 6 by means of insulators 3. The rings are earthed as by a wire 5.

In the arrangement shown in Figure 3, there is provided a corrector loop aerial 7, having a comparatively small number of turns, placed in athwartship direction and connected to a screened fixed field coil 8. 9 is a similar corrector loop aerial arranged in a fore and aft direction, and connected to a screened fixed field coil 10. The field coils 8, 10, may be adjusted by screws 11. Coupling coils 12, 13 are rotatably mounted within the coils 8, 10, respectively, and are mounted upon a rod 14 fast with a gear wheel 15 in mesh with a gear wheel 16 fast with a rod 17 by which the main directional aerial 1 is rotated, said aerial being enclosed by the container 6, having earthed rings 2 on its exterior. It will be seen that the coupling coils 12, 13 are rotated in step with, but in the reverse direction to, that of the main aerial. The coupling coils 12, 13 are connected so as to induce supplementary E. M. F. in the detecting and amplifying circuit.

A correction circuit of the type described in my above referred to co-pending application No. 33,064 and comprising condenser 18 and inductance coil 19, is indirectly connected to the aerial 1 through brushes 20 and slip rings 21. A vertical aerial for sense reading is indicated at 22.

I have found in practice that when a directional aerial of the rotating frame type is employed, best results are obtained when the rings are circular in form and their centers lie along the axis of the frame. With such an arrangement the bonding and insulating of the rings may be carried out in any convenient manner, and in some cases the surface leakage of the container may be sufficient to earth and to connect the rings.

When a Bellini-Tosi type of aerial is employed, however I have obtained best results when each ring is fully insulated and a single earthing bond is joined up to all of them in a vertical line. In this case the rings may be other than circular; they may, for example, be square or rectangular, it being desirable merely that they be arranged in a symmetrical plan about the aerial.

I have also found that the distance and spacing of the rings from the directional aerial is of some importance. When using a Bellini-Tosi type of fixed aerial, having frames approximately four feet wide and six feet high, each wound with five turns of wire spaced at one inch, I have obtained good results with rings spaced about four to six inches apart and about four or five inches clear of the frames.

Among the advantages obtained by the use of apparatus made in accordance with the present invention is an improvement in the definition of zero-reading positions. With the rings in place, zero-reading positions become exceedingly sharp and truly opposite. Further, it becomes possible to obtain with a small directional aerial system of simple construction, results which, so far as I am aware, have hitherto been obtainable only with large or complicated installations. It will be appreciated that owing to this feature the invention is particularly useful for shipboard and other installations, where space is limited and the presence of a large aerial likely to be an obstruction.

Having thus described my invention what I claim as new and useful and desire to secure by Letters Patent is:

1. In a receiving system, a loop, a plurality of rings of conducting material surrounding said loop and arranged in different planes, each of said rings being adapted to form a closed circuit in one plane only, and a single means for grounding all of said conducting rings.

2. In a receiving system, a loop, a plurality of rings of conducting material surrounding said loop, all of said rings being arranged in separate parallel planes and each adapted to form a closed circuit in one plane only, and means associated with each of said rings for connecting the same to the ground.

3. In a radio signal receiving system, a rotatable loop, a container formed of insulating material surrounding said loop, a plurality of rings of conducting material each arranged in separate planes carried by said container in a manner such that each ring forms a complete closed circuit in one plane only and said rings are so arranged that the centers thereof lie along the axis of the container and along the axis of said rotatable loop, and means associated with each of said conducting rings for connecting the same to ground and thereby shield said loop.

4. In a directional aerial system a loop aerial, and shielding means therefor including a closed conductor surrounding said loop, said conductor lying in a plane perpendicular to the axis of said loop.

5. In a directional aerial system, a rotatable frame aerial, and a static shield therefor including a plurality of closed conductors surrounding said aerial, said conductors being spaced apart from one another and lying in different non-intersecting planes.

FRED WOODS.